(12) United States Patent
Zhang

(10) Patent No.: US 10,162,239 B2
(45) Date of Patent: Dec. 25, 2018

(54) ARRAY SUBSTRATE, PREPARATION METHOD THEREFOR, DISPLAY PANEL, AND DISPLAY DEVICE

(71) Applicant: BOE Technology Group Co., Ltd., Beijing (CN)

(72) Inventor: Feng Zhang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 18 days.

(21) Appl. No.: 15/522,594

(22) PCT Filed: Dec. 24, 2015

(86) PCT No.: PCT/CN2015/098709
§ 371 (c)(1),
(2) Date: Apr. 27, 2017

(87) PCT Pub. No.: WO2017/036016
PCT Pub. Date: Mar. 9, 2017

(65) Prior Publication Data
US 2017/0336662 A1  Nov. 23, 2017

(30) Foreign Application Priority Data
Aug. 28, 2015 (CN) .......................... 2015 1 0543473

(51) Int. Cl.
*H01L 27/12* (2006.01)
*G02F 1/1368* (2006.01)
(Continued)

(52) U.S. Cl.
CPC .......... *G02F 1/1368* (2013.01); *G02F 1/1362* (2013.01); *G02F 1/133345* (2013.01);
(Continued)

(58) Field of Classification Search
None
See application file for complete search history.

(56) References Cited

U.S. PATENT DOCUMENTS

2005/0270445 A1 12/2005 Lee et al.
2006/0232529 A1* 10/2006 Midorikawa ..... G02F 1/133514
345/87
(Continued)

FOREIGN PATENT DOCUMENTS

CN 1677207 A 10/2005
CN 101257031 A 9/2008
(Continued)

OTHER PUBLICATIONS

May 23, 2016—(WO) International Search Report and Written Opinion Appn PCT/CN2015/098709 with English Tran.
(Continued)

*Primary Examiner* — Ali Naraghi
(74) *Attorney, Agent, or Firm* — Banner & Witcoff, Ltd.

(57) ABSTRACT

An array substrate, a preparation method therefor, a display panel, and a display device. A color film layer of the array substrate comprises filtering patterns of multiple different colors. The filtering pattern of each color comprises multiple filtering units. The filtering patterns of at least two different colors are provided with overlapped portions at the positions corresponding to multiple gate lines, multiple data lines and multiple thin-film transistors. The overlapped portions are used for partitioning the filtering units. One of the filtering patterns of at least two different colors and having the overlapped portions at the positions corresponding to the multiple gate lines and the multiple thin-film transistors is the filtering pattern with the lowest light transmittance in the filtering patterns of the multiple different colors.

20 Claims, 8 Drawing Sheets

(51) Int. Cl.
*G02F 1/1362* (2006.01)
*G02F 1/1333* (2006.01)
*G02F 1/1343* (2006.01)

(52) U.S. Cl.
CPC .. *G02F 1/136286* (2013.01); *G02F 1/134363* (2013.01); *G02F 2001/136222* (2013.01); *G02F 2001/136295* (2013.01)

(56) References Cited

U.S. PATENT DOCUMENTS

| | | | |
|---|---|---|---|
| 2009/0263921 A1 | 10/2009 | Lee et al. | |
| 2015/0187821 A1* | 7/2015 | Kim | H01L 27/1248 257/390 |
| 2016/0141307 A1* | 5/2016 | Lee | H01L 27/124 257/72 |
| 2016/0202543 A1* | 7/2016 | Park | G02F 1/13394 349/42 |
| 2016/0238901 A1* | 8/2016 | Mizuno | G02F 1/136227 |

FOREIGN PATENT DOCUMENTS

| | | |
|---|---|---|
| CN | 102169262 A | 8/2011 |
| CN | 104793390 A | 7/2015 |
| CN | 105045011 A | 11/2015 |

OTHER PUBLICATIONS

Jul. 5, 2017—(CN) First Office Action Appn 201510543473.0 with English Tran.

* cited by examiner

ARRAY SUBSTRATE, PREPARATION METHOD THEREFOR, DISPLAY PANEL, AND DISPLAY DEVICE

The application is a U.S. National Phase Entry of International Application No. PCT/CN2015/098709 filed on Dec. 24, 2015, designating the United States of America and claiming priority to Chinese Patent Application No. 201510543473.0, filed Aug. 28, 2015. The present application claims priority to and the benefit of the above-identified applications and the above-identified applications are incorporated by reference herein in their entirety.

TECHNICAL FIELD

At least one embodiment of the present disclosure relates to an array substrate, a manufacturing method thereof, a display panel and a display device.

BACKGROUND

Display devices such as liquid crystal displays (LCDs) and organic light-emitting diode (OLED) displays have become daily necessities and quietly changed people's lives. People have higher and higher requirements on the quality such as the resolution, color gamut and brightness of the display devices. Recently, 500 PPI (Pixels Per Inch) and 600 PPI products have been developed by the company.

For example, an LCD is usually manufactured by bonding an array substrate and a color filter (CF) substrate together by cell-assembly process. However, during cell-assembly, there is certain deviation between the array substrate and the CF substrate. The deviation will result in the problems such as the reduced aperture opening ratio of the LCD and light leakage. Moreover, when the LCD has higher PPI, the aperture opening ratio is more seriously reduced. Meanwhile, the performances such as the brightness and the color gamut of products will also be reduced, but the energy consumption of the LCD will be increased.

In order to eliminate the deviation between the array substrate and the CF substrate, improve the aperture opening ratio, and reduce the cost, panel manufacturers have developed a technology for forming CFs and black matrixes (BMs) on an array substrate, namely color on array (COA) technology. The COA technology arranges the CFs and the BMs on the array substrate and hence can reduce the deviation between the array substrate and the CF substrate during cell-assembly, improve the aperture opening ratio, reduce the cost, and improve the display quality of products.

SUMMARY

At least one embodiment of the present disclosure provides an array substrate, a manufacturing method thereof, a display panel and a display device. The array substrate does not require BMs and then can reduce the process of forming the BMs, and hence can simplify the manufacturing process and reduce the cost.

At least one embodiment of the present disclosure provides an array substrate, comprising a base substrate and a color filter (CF) layer, a plurality of thin-film transistors (TFTs), a plurality of data lines and a plurality of gate lines disposed on the base substrate, wherein the CF layer includes a plurality of filter patterns of different colors, and filter patterns of each color include a plurality of filter units; at least two kinds of filter patterns of different colors are provided with mutually superimposed parts at positions corresponding to the plurality of gate lines, the plurality of data lines and the plurality of TFTs; the superimposed parts are configured to separate the filter units; and one of the at least two kinds of filter patterns of different colors, provided with the mutually superimposed parts at the positions corresponding to the plurality of gate lines and the plurality of TFTs, are filter patterns with minimum light transmittance in the plurality of filter patterns of different colors.

For example, in the array substrate provided in one embodiment of the disclosure, one of the at least two kinds of filter patterns of different colors, provided with the mutually superimposed parts at the positions corresponding to the plurality of data lines, are the filter patterns with minimum light transmittance.

For example, in the array substrate provided in one embodiment of the disclosure, the plurality of filter patterns of different colors include blue filter patterns, red filter patterns and green filter patterns.

For example, in the array substrate provided in one embodiment of the disclosure, the at least two kinds of filter patterns of different colors, provided with the mutually superimposed parts at the positions corresponding to the plurality of gate lines, the plurality of data lines and the plurality of TFTs, include the blue filter patterns and the red filter patterns.

For example, in the array substrate provided in one embodiment of the disclosure, at least three kinds of filter patterns of different colors are provided with mutually superimposed parts at positions corresponding to the plurality of gate lines, the plurality of data lines and the plurality of TFTs.

For example, in the array substrate provided in one embodiment of the disclosure, the at least three kinds of filter patterns of different colors include blue filter patterns, red filter patterns and green filter patterns.

For example, in the array substrate provided in one embodiment of the disclosure, the filter patterns with the minimum light transmittance are the blue filter patterns.

For example, in the array substrate provided in one embodiment of the disclosure, the CF layer is disposed above the plurality of gate lines, the plurality of data lines and the plurality of TFTs.

For example, in the array substrate provided in one embodiment of the disclosure, the plurality of data lines and the plurality of gate lines are intersected to define a plurality of subpixels arranged in an array; and each subpixel corresponds to one filter unit and includes at least one TFT.

For example, the array substrate provided in one embodiment of the disclosure further comprises a planarization layer, wherein the planarization layer is disposed on the CF layer and provided with a planar or basically planar surface.

At least one embodiment of the disclosure provides a method for manufacturing an array substrate, comprising forming a CF layer, a plurality of TFTs, a plurality of data lines and a plurality of gate lines on a base substrate, wherein the CF layer includes a plurality of filter patterns of different colors, and filter patterns of each color include a plurality of filter units; at least two kinds of filter patterns of different colors are provided with mutually superimposed parts at positions corresponding to the plurality of gate lines, the plurality of data lines and the plurality of TFTs; the superimposed parts are configured to separate the filter units; and one of the at least two kinds of filter patterns of different colors, provided with the mutually superimposed parts at the positions corresponding to the plurality of gate lines and the plurality of TFTs, are filter patterns with minimum light transmittance in the plurality of filter patterns of different colors.

For example, in the method for manufacturing the array substrate provided in one embodiment of the disclosure, one of the at least two kinds of filter patterns of different colors, provided with the mutually superimposed parts at the positions corresponding to the plurality of data lines, are the filter patterns with minimum light transmittance.

At least one embodiment of the disclosure provides a display panel, comprising any array substrate as mentioned above.

At least one embodiment of the disclosure provides a display device, comprising the display panel as mentioned above.

BRIEF DESCRIPTION OF THE DRAWINGS

Simple description will be given below to the accompanying drawings of the embodiments to provide a more clear understanding of the technical proposals of the embodiments of the present disclosure. Obviously, the drawings described below only involve some embodiments of the present disclosure but are not intended to limit the present disclosure.

FIG. 3 is a sectional view 1 of the array substrate provided by one embodiment of the present disclosure along the A-A' direction in FIG. 1a;

FIG. 4 is a sectional view 1 of the array substrate provided by one embodiment of the present disclosure along the B-B' direction in FIG. 1a;

FIG. 5 is a sectional view 1 of the array substrate provided by one embodiment of the present disclosure along the C-C' direction in FIG. 1a;

FIG. 7 is a sectional view 2 of the array substrate provided by another embodiment of the present disclosure along the A-A' direction in FIG. 1a;

FIG. 8 is a sectional view 2 of the array substrate provided by another embodiment of the present disclosure along the B-B' direction in FIG. 1a;

FIG. 9 is a sectional view 2 of the array substrate provided by another embodiment of the present disclosure along the C-C' direction in FIG. 1a;

FIG. 11 is a sectional view 3 of the array substrate provided by still another embodiment of the present disclosure along the A-A' direction in FIG. 1a;

FIG. 12 is a sectional view 3 of the array substrate provided by still another embodiment of the present disclosure along the B-B' direction in FIG. 1a;

FIG. 13 is a sectional view 3 of the array substrate provided by still another embodiment of the present disclosure along the C-C' direction in FIG. 1a.

REFERENCE NUMERALS OF THE ACCOMPANYING DRAWINGS

Figure 1A:
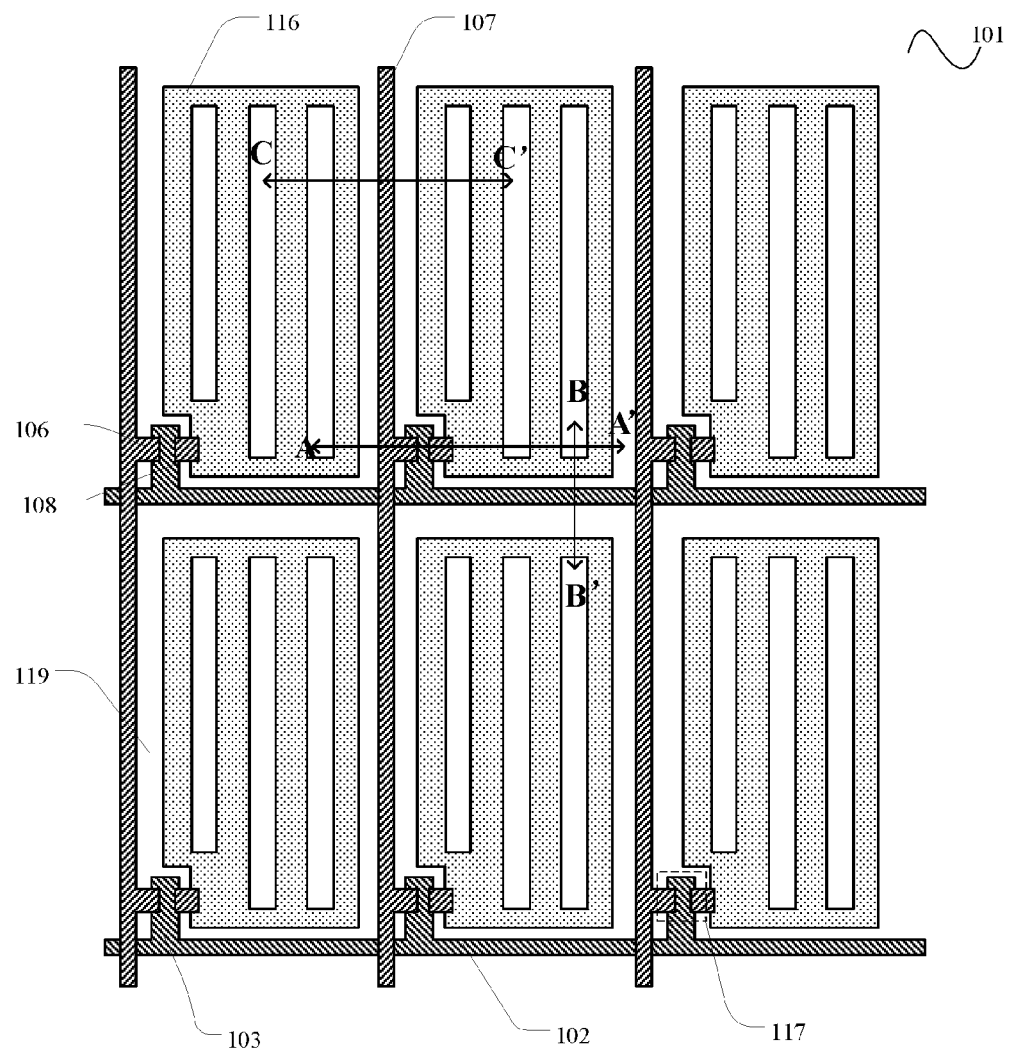
FIG. 1a is a schematic sectional view of an array substrate provided by one embodiment of the present disclosure.

101—base substrate; 102—gate line; 103—gate electrode; 104—gate insulating layer; 105—active layer; 106—electrode; 107—data line; 108—drain electrode; 109—insulating layer; 110—green filter pattern; 1101—green first extension; 1102—green main part; 1103—green lateral extension; 1104—green third extension; 111—red filter pattern; 1111—red first extension; 1112—red main part; 1113—red lateral extension; 112—blue filter pattern; 1121—blue first extension; 1122—blue main part; 1123—blue lateral extension; 1124—blue third extension; 113—planarization layer; 114—common electrode; 115—passivation layer; 116—pixel electrode; 117—TFT; 118—CF layer; 119—subpixel; 121—filter unit; 122—superimposed part; 124—through hole.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. Obviously, the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

At least one embodiment of the present disclosure provides an array substrate, which comprises a base substrate and a CF layer, a plurality of TFTs, a plurality of data lines and a plurality of gate lines disposed on the base substrate. The CF layer includes a plurality of filter patterns of different colors, and filter patterns of each color include a plurality of filter units. At least two kinds of filter patterns of different colors are provided with mutually superimposed parts at positions corresponding to the plurality of gate lines, the plurality of data lines and the plurality of TFTs, and the superimposed parts are configured to separate the filter units. One of the at least two kinds of filter patterns of different colors, provided with the mutually superimposed parts at the positions corresponding to the gate lines and the plurality of TFTs, are filter patterns with minimum light transmittance in the plurality of filter patterns of different colors.

At least one embodiment of the present disclosure provides a method for manufacturing an array substrate, which comprises: forming a CF layer, a plurality of TFTs, a plurality of data lines and a plurality of gate lines on a base substrate. The CF layer includes a plurality of filter patterns of different colors, and filter patterns of each color include a plurality of filter units. At least two kinds of filter patterns of different colors are provided with mutually superimposed parts at positions corresponding to the plurality of gate lines, the plurality of data lines and the plurality of TFTs, and the superimposed parts are configured to separate the filter units. One of the at least two kinds of filter patterns of different colors, provided with the mutually superimposed parts at the positions corresponding to the gate lines and the plurality of TFTs, are filter patterns with minimum light transmittance in the plurality of filter patterns of different colors.

The array substrate and the manufacturing method thereof, provided by at least one embodiment of the present disclosure, do not require the additional arrangement of BMs and hence can reduce the process of forming the BMs in the manufacturing process, reduce a mask for forming the BMs, save materials, and reduce the cost. Moreover, as one of the at least two kinds of filter patterns of different colors, provided with the mutually superimposed parts at the positions corresponding to the gate lines and the plurality of TFTs, are filter patterns with minimum light transmittance in the plurality of filter patterns of different colors, superior light-shielding effect can be achieved.

Further description will be given below with reference to several embodiments.

First Embodiment

The embodiment provides an array substrate. As illustrated in FIGS. 1a and 1b and FIGS. 2 to 5, the array substrate comprises a base substrate 101 and a CF layer 118, a plurality of TFTs 117, a plurality of data lines 107 and a plurality of gate lines 102 disposed on the base substrate 101.

For example, as illustrated in FIG. 1a, the plurality of data lines 107 and the plurality of gate lines 102 are intersected with and insulated from each other to define a plurality of subpixels 119 arranged in an array.

It should be noted that the subpixels 119 may be defined by the plurality of gate lines 102 and the plurality of data lines 107, but the present disclosure is not limited thereto. One subpixel 119, for example, includes one gate line, one data line, one pixel electrode and one switching element. The subpixel 119 is the minimum display unit in the array substrate. The following embodiments may be the same with the case.

Figure 1B:
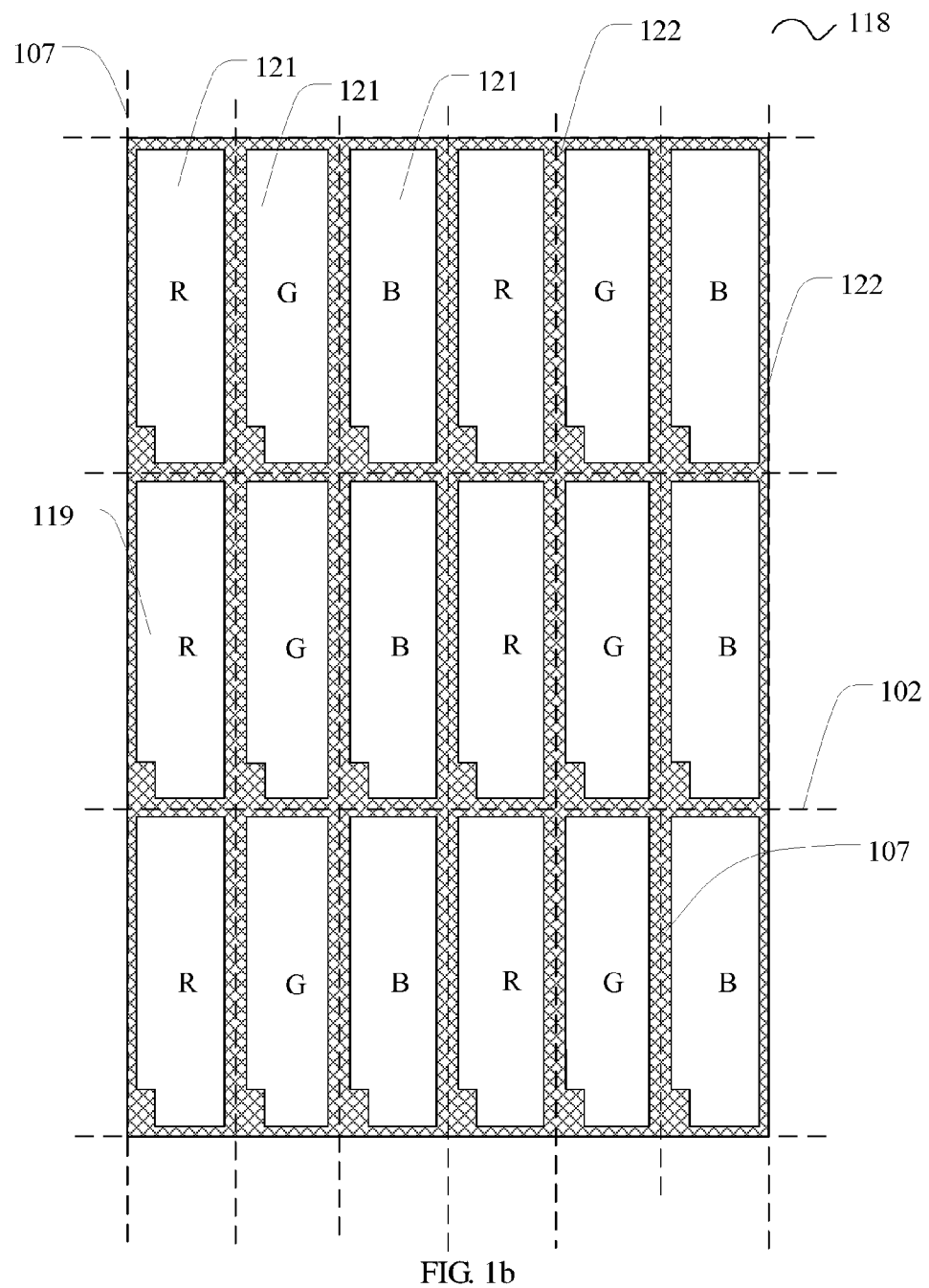
FIG. 1b is a schematic diagram of a CF layer in the array substrate provided by one embodiment of the present disclosure.

For example, as illustrated in FIG. 1b, the CF layer 118 includes a plurality of filter patterns of different colors, and filter patterns of each color include a plurality of filter units 121. At least two kinds of filter patterns of different colors are provided with mutually superimposed parts at positions corresponding to the plurality of gate lines 102, the plurality of data lines 107 and the plurality of TFTs 117, and the superimposed parts are configured to separate the filter units 121. For example, the superimposed parts 122 are configured to separate the filter units 121 in the plurality of filter patterns of different colors. Peripheral areas around the filter units 121 are the superimposed parts for separating the filter units 121, namely superimposed parts 122 formed by the at least two kinds of filter patterns of different colors. The superimposed parts 122 are disposed at the positions corresponding to the plurality of gate lines, the plurality of data lines and the plurality of TFTs. The superimposed parts 122 are configured to separate the filter units 121. In the figure, dotted lines are used to represent the plurality of data lines 107, the plurality of gate lines 102 and the subpixels 119 disposed on the base substrate.

For example, in the CF layer 118, other superimposed parts may also be disposed apart from the superimposed parts 122 at the positions corresponding to the plurality of gate lines 102, the plurality of data lines 107 and the plurality of TFTs 117. No limitation will be given here in the present disclosure.

It should be noted that the separation of the filter units includes the separation of adjacent filter units in filter patterns of the same color and the separation of adjacent filter units in filter patterns of different colors.

Figure 2:
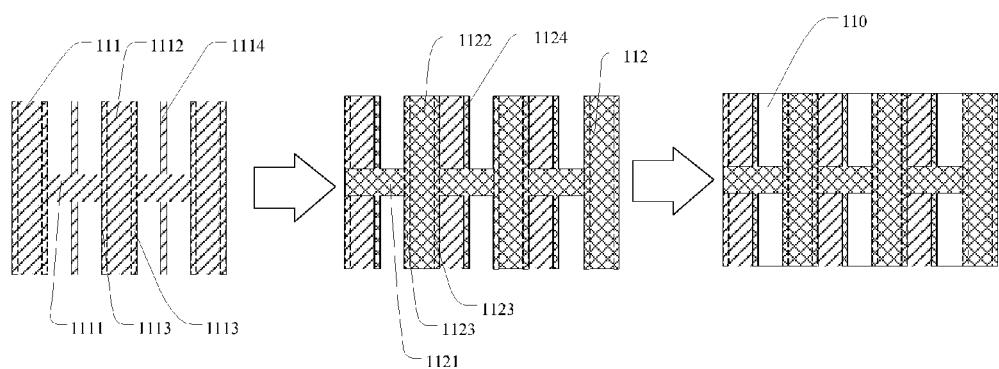
FIG. 2 is a flowchart 1 of a process of forming the CF layer in the array substrate provided by one embodiment of the present disclosure.

As illustrated in FIG. 2, the CF layer 118 includes a plurality of filter patterns of different colors, for example, including green filter patterns 110, red filter patterns 111 and blue filter patterns 112. At least two kinds of filter patterns of different colors are provided with mutually superimposed parts at positions corresponding to the plurality of gate lines 102, the plurality of data lines 107 and the plurality of TFTs 117, and the superimposed parts are configured to separate the filter units. Moreover, one of the at least two kinds of filter patterns of different colors, provided with the mutually superimposed parts at the positions corresponding to the plurality of gate lines 102 and the plurality of TFTs 117, are filter patterns with minimum light transmittance in the plurality of filter patterns of different colors.

Figure 3:
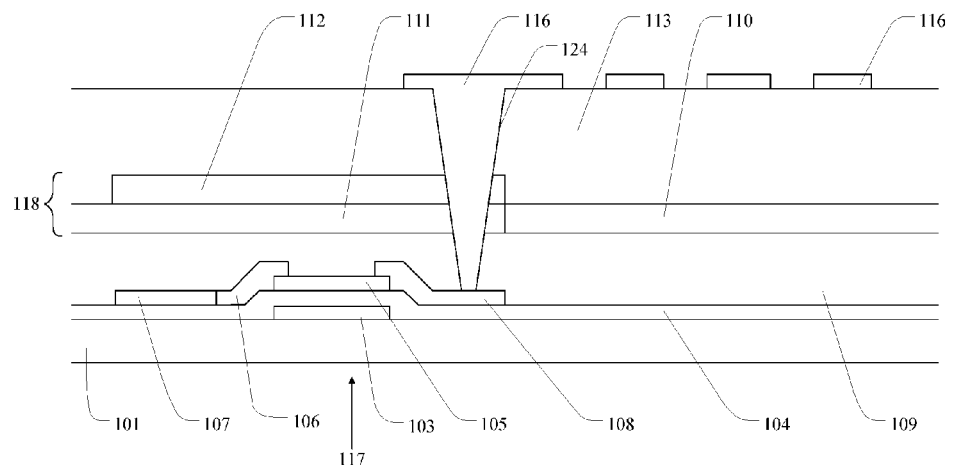
Figure 4:
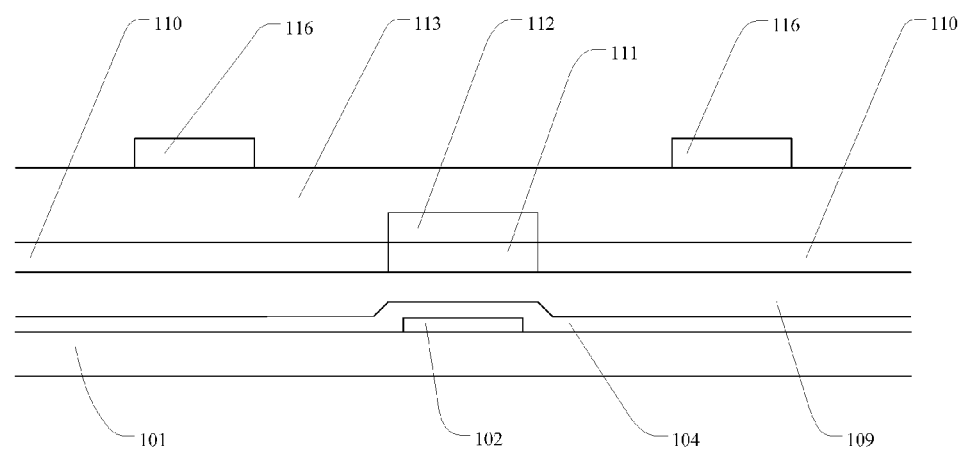
Figure 5:
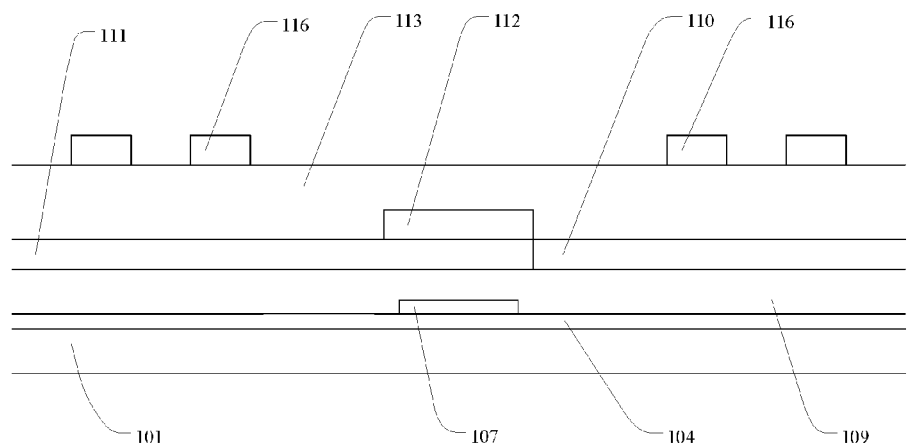

For example, FIG. 3 is a sectional view along the A-A' direction in FIG. 1a; FIG. 4 is a sectional view along the B-B' direction in FIG. 1a; and FIG. 5 is a sectional view along the C-C' direction in FIG. 1a. As illustrated in FIG. 3, in the CF layer, the red filter pattern 111 and the blue filter pattern 112 are provided with a mutually superimposed part at a position corresponding to the TFT 117. As illustrated in FIG. 4, the red filter pattern 111 and the blue filter pattern 112 are provided with a mutually superimposed part at a position corresponding to the gate line 102. As illustrated in FIG. 5, the blue filter pattern 112 and the red filter pattern 111 are provided with a mutually superimposed part at a position corresponding to the data line 107. One of the at least two kinds of filter patterns of different colors, provided with the mutually superimposed parts at the positions corresponding to the plurality of data lines 107, the plurality of gate lines 102 and the plurality of TFTs 117, are filter patterns with minimum light transmittance in the plurality of filter patterns of different colors. For example, the filter patterns with the minimum light transmittances are the blue filter patterns 112. The superimposed part, for example, indicates an overlapped part of the at least two filter patterns of different colors in the direction perpendicular to the base substrate.

For example, as illustrated in FIG. 3, the array substrate comprises TFTs 117 and pixel electrodes 116. In the array substrate, gate electrodes 103 are disposed on the base substrate 101. A gate insulating layer 104 is disposed on a layer provided with the gate electrodes 103. Active layers (semiconductor layers) 105 are disposed on the gate insulating layer 104. Source electrodes 106 and drain electrodes 108 are disposed on the active layers 105; both the source electrode 106 and the drain electrode 108 are connected with the active layer 105; and the source electrode 106 and the drain electrode 108 are respectively disposed on both sides of the active layer 105. A gap is formed between the source electrode 106 and the drain electrode 108 to define a channel region. An insulating layer 109 is disposed on a layer provided with the source electrodes 106 and the drain electrodes 108. A CF layer 118 is disposed on the insulating layer 109. A planarization layer 113 is disposed on the CF layer 118 and provided with a planar or basically planar surface. The pixel electrodes 116 are disposed on the planarization layer 113 and connected with the drain electrodes 108 of the TFTs via through holes 124.

For example, as illustrated in FIG. 3, the CF layer 118 is disposed above the TFTs 117. At this point, the TFTs with a bottom-gate structure as illustrated in FIG. 3 may be adopted. The superimposed parts in the CF layer cover a plurality of TFTs, so as to prevent the active layers from being irradiated by front light sources (e.g., natural light) from top. The gate electrodes of the TFTs with the bottom-gate structure can prevent the active layers from being irradiated by backlight from bottom. As illustrated in FIGS. 4 and 5, the superimposed parts in the CF layer 118 are disposed over the plurality of data lines 107 and the plurality of gate lines 102.

It should be noted that the TFTs in the embodiment may also be TFTs with a top-gate structure. No limitation will be given here. For example, when the TFTs adopt the top-gate structure, the CF layer 118 may be disposed below the plurality of TFTs 117, but the present disclosure is not limited thereto.

For example, the gate electrodes 103 of the TFTs 117 are electrically connected or integrally formed with corresponding gate lines 102, and the source electrodes 106 are electrically connected or integrally formed with corresponding data lines 107.

For example, the materials of the plurality of gate lines 102 and/or the plurality of gate lines 107 are metals, for example, may be a single layer of any of aluminum, aluminum alloy, copper, copper alloy, molybdenum or the like, or a superimposed layer of several above metals.

For example, FIG. 2 is a flowchart of a process of forming the CF layer. As illustrated in FIG. 2, the CF layer includes three kinds of filter patterns of different colors. The process of forming the CF layer includes the following steps.

(1) Firstly, forming red filter patterns 111. The red filter pattern 111 includes a red first extension 1111 extended along the gate line direction, a red main part 1112 extended along the data line direction, red lateral extensions 1113 disposed on both sides of the red main part 1112 and at positions corresponding to the data line, and a third extension 1114 disposed between a green filter pattern 110 and a blue filter pattern 112 and at a position corresponding to the data line. For example, the length of the red first extension 1111 extended along the gate line direction is greater than or equal to the length of two subpixels (the two subpixels are, for example, respectively a green subpixel and a blue subpixel) along the gate line direction.

(2) Secondly, forming blue filter patterns 112. The blue filter pattern includes a blue first extension 1121 extended along the gate line direction, a blue main part 1122 extended along the data line direction, blue lateral extensions 1123 disposed on both sides of the blue main part 1122 and at positions corresponding to the data line, and a blue third extension 1124 disposed between the green filter pattern 110 and the red filter pattern 111 and at a position corresponding to the data line. The blue first extension 1121 and the blue main part 1122 of the blue filter pattern 112 are superimposed with the red first extension 1111 of the red filter pattern 111 at positions corresponding to the gate line and the TFT. Thus, in the CF layer, two filter patterns of different colors (the red filter pattern 111 and the blue filter pattern 112) are provided with mutually superimposed parts at positions corresponding to the gate line and the TFT. For example, orthographic projections of the superimposed parts on the base substrate 101 completely cover orthographic projections of the gate line and the TFT on the base substrate 101. The blue lateral extensions 1123 of the blue filter pattern 112 are superimposed with the red third extension 1114 and the red lateral extension 1113 at positions corresponding to the data line. The blue third extension 1124 of the blue filter pattern 112 is superimposed with the red lateral extension 1113 of the red filter pattern 111 at a position corresponding to the data line. For example, an orthographic projection of the superimposed part on the base substrate 101 completely covers an orthographic projection of the data line on the base substrate 101, so as to shield light. Thus, the blue filter pattern 112 and the red filter pattern 111 are provided with mutually superimposed parts at the positions corresponding to the data line. For example, orthographic projections of the superimposed parts on the base substrate 101 completely cover orthographic projections of the data line on the base substrate 101.

(3) Finally, forming green filter patterns 110. The green filter pattern only includes a green main part. The green main part is provided with a green filter unit. The blue filter patterns 112 are filter patterns with minimum light transmittance in the above three kinds of filter patterns of different colors.

The embodiment further provides a method for manufacturing an array substrate, which comprises: forming a CF layer, a plurality of TFTs, a plurality of data lines and a plurality of gate lines on a base substrate. The CF layer includes a plurality of filter patterns of different colors, and filter patterns of each color include a plurality of filter units. In the CF layer, at least two kinds of filter patterns of different colors are provided with mutually superimposed parts at positions corresponding to the plurality of gate lines, the plurality of data lines and the plurality of TFTs, and the superimposed parts are configured to separate the filter units. One of the at least two kinds of filter patterns of different colors, provided with the mutually superimposed parts at the positions corresponding to the gate lines and the plurality of TFTs, are filter patterns with minimum light transmittance in the plurality of filter patterns of different colors.

For example, in the method for manufacturing the array substrate, the process of forming the CF layer may be as described above.

In summary, in the CF layer, the red filter patterns and the blue filter patterns are provided with mutually superimposed parts at the positions corresponding to the plurality of gate lines and the plurality of TFTs, and the superimposed parts are configured to separate the filter units. In the CF layer, the red filter patterns and the blue filter patterns are provided with mutually superimposed parts at the positions corresponding to the plurality of data lines, and the superimposed parts are configured to separate the filter units.

For example, each subpixel corresponds to a filter unit of one green filter pattern 110, one red filter pattern 111 or one blue filter pattern 112. For example, each subpixel includes at least one TFT.

It should be noted that FIGS. 3 to 5 only illustrate the superimposition condition of the filter patterns in the CF layer at positions of corresponding section lines.

For example, the planarization layer 113 in the embodiment may be made from organic insulating materials. The organic insulating material may include acrylic resin or polyimide resin.

For example, the planarization layer 113 may be configured to perform planarization treatment on the CF layer 118 and has low dielectric constant, for example, dielectric constant<5. The planarization layer includes a planar or basically planar surface.

For example, each CF pattern with different colors may be made from corresponding color resin.

For example, the superimposed parts in the CF layer have the effect of light shielding. Thus, BMs may be not arranged. The following embodiments may be the same with the case.

It should be noted that the CF patterns in the embodiment are not limited to the above forming sequence. No limitation will be given to the forming sequence of the CF patterns. Moreover, filter patterns of each color may be formed by one mask. The division of a plurality of parts is only for better understanding of the conditions of various superimposed parts. The forming of the CF patterns in the embodiment is not limited to the given forming process.

Second Embodiment

The embodiment provides an array substrate. As illustrated in FIGS. 1a and 1b and FIGS. 6 to 9, the array substrate comprises a base substrate 101 and a CF layer 118, a plurality of TFTs 117, a plurality of data lines 107 and a plurality of gate lines 102 disposed on the base substrate 101.

For example, as illustrated in FIG. 1a, the plurality of data lines 107 and the plurality of gate lines 102 are intersected with and insulated from each other to define a plurality of subpixels 119 arranged in an array. But the present disclosure is not limited thereto. Each subpixel includes a TFT 117 taken as a switching element and a pixel electrode 116 configured to control the deviation of liquid crystals and electrically connected with the switching element. CF patterns in the embodiment may be arranged corresponding to the subpixels.

For example, as illustrated in FIG. 1b, the CF layer 118 includes a plurality of filter patterns of different colors, and filter patterns of each color include a plurality of filter units 121. At least two kinds of filter patterns of different colors are provided with mutually superimposed parts 122 at positions corresponding to the plurality of gate lines 102, the plurality of data lines 107 and the plurality of TFTs 117, and the superimposed parts 122 are configured to separate the filter units 121. Peripheral areas around the filter units 121 are the superimposed parts 122 for separating the filter units 121. That is to say, the at least two kinds of filter patterns of different colors are superimposed to form the superimposed parts 122 for separating the filter units 121. The superimposed parts 122 are disposed at the positions corresponding to the plurality of gate lines, the plurality of data lines and the plurality of TFTs. In the figure, dotted lines are used to represent the plurality of data lines 107, the plurality of gate lines 102 and the subpixels 119 disposed on the base substrate.

For example, as illustrated in FIG. 1b, in the CF layer 118, at least two kinds of filter patterns of different colors are provided with mutually superimposed parts at positions corresponding to the plurality of gate lines 102, the plurality of data lines 107 and the plurality of TFTs 117, and the superimposed parts are configured to separate the filter units. Moreover, one of the at least two kinds of filter patterns of different colors, provided with the mutually superimposed parts at the positions corresponding to the plurality of gate lines 102 and the plurality of TFTs 117, are filter patterns with minimum light transmittance in the plurality of filter patterns of different colors.

Figure 6:
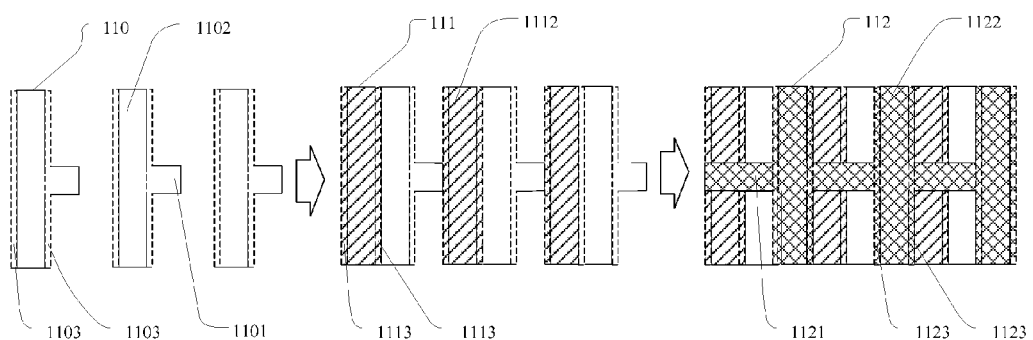
FIG. 6 is a flowchart 2 of a process of forming a CF layer in an array substrate provided by another embodiment of the present disclosure.

As illustrated in FIG. 6, the CF layer 118 includes a plurality of filter patterns of different colors, for example, including green filter patterns 110, red filter patterns 111 and blue filter patterns 112. The filter pattern with the minimum light transmittance is the blue filter pattern 112.

Figure 7:
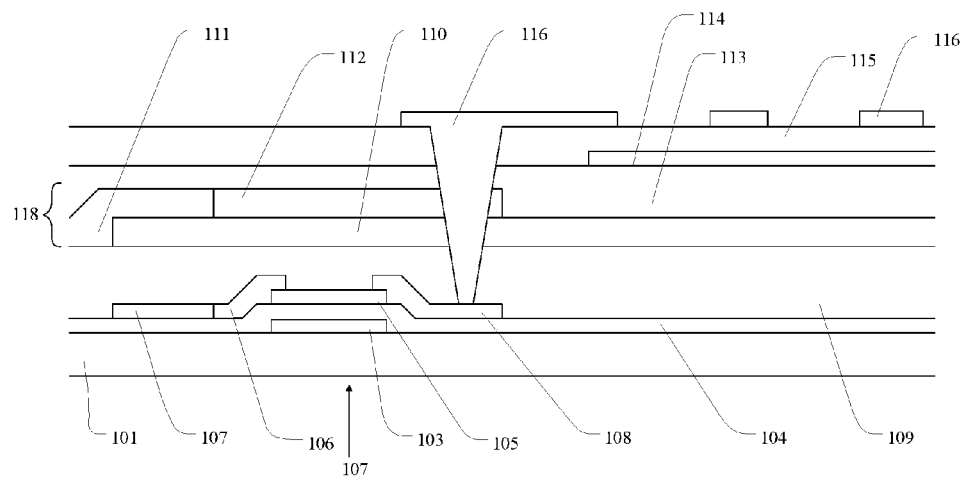
Figure 8:
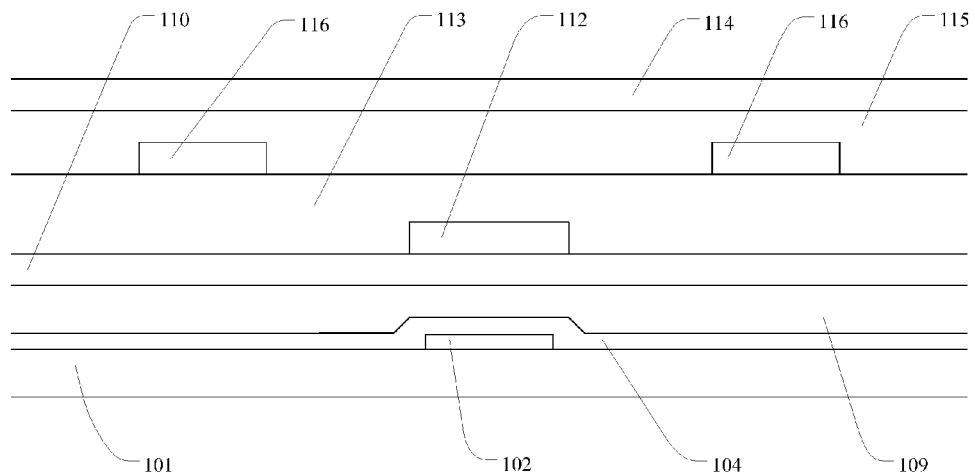
Figure 9:
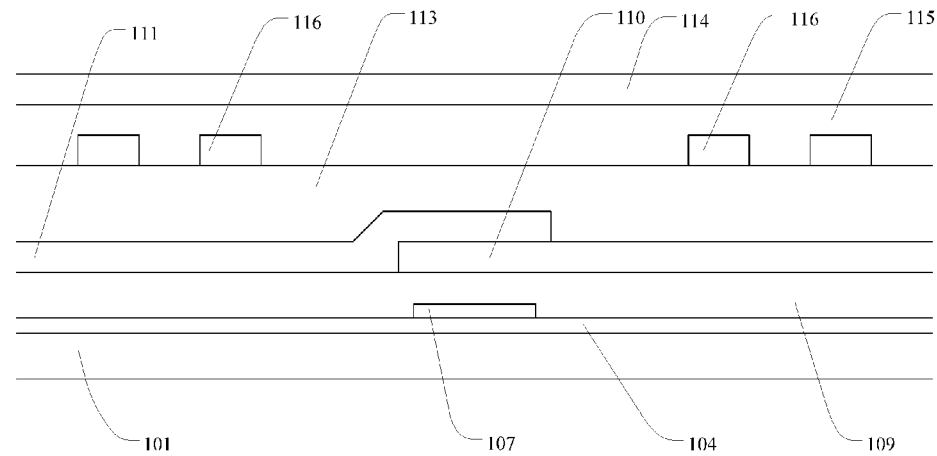

For example, FIG. 7 is a sectional view along the A-A' direction in FIG. 1a; FIG. 8 is a sectional view along the B-B' direction in FIG. 1a; and FIG. 9 is a sectional view along the C-C' direction in FIG. 1a. As illustrated in FIG. 7, the green filter pattern 110 and the blue filter pattern 112 are provided with a mutually superimposed part at a position corresponding to the TFT 117. As illustrated in FIG. 8, the green filter pattern 110 and the blue filter pattern 112 are provided with a mutually superimposed part at a position corresponding to the gate line 102. As illustrated in FIGS. 7 and 9, the red filter pattern 111 and the green filter pattern 110 are provided with a mutually superimposed part at a position corresponding to the data line 107. The superimposed parts are configured to separate the filter units.

It should be noted that FIGS. 7 to 9 only illustrate the superimposition condition of the filter patterns in the CF layer at positions of corresponding section lines.

For example, as illustrated in FIG. 7, in the array substrate, gate electrodes 103 are disposed on the base substrate 101. A gate insulating layer 104 is disposed on a layer provided with the gate electrodes 103. Active layers (semiconductor layers) 105 are disposed on the gate insulating layer 104. Source electrodes 106 and drain electrodes 108 are disposed on the active layers 105; both the source electrode 106 and the drain electrode 108 make contact with the active layer 105; and the source electrode 106 and the drain electrode 108 are respectively disposed on both sides of the active layer 105, and for example, are respectively electrically connected with corresponding data line 107 and corresponding pixel electrode 116. A gap is formed between the source electrode 106 and the drain electrode 108 to define a channel region. An insulating layer 109 is disposed on a layer provided with the source electrodes 106 and the drain electrodes 108. A CF layer 108 is disposed on the insulating layer 109. A planarization layer 113 is disposed on the CF layer 118. Common electrodes 114 are disposed on the planarization layer 113. A passivation layer 115 is disposed on a layer provided with the common electrodes 114. The pixel electrodes 116 are disposed on the passivation layer 115 and connected with the drain electrodes 108 of the TFTs via through holes.

It should be noted that description is given in the embodiment by taking the case that the slit pixel electrodes are disposed above and the planar common electrode is disposed below as an example. The common electrodes in the embodiment may also be disposed above the pixel electrodes, and the common electrodes disposed above are slit electrodes. No limitation will be given here.

For example, the gate electrodes 103 of the TFTs 117 are electrically connected or integrally formed with corresponding gate lines 102, and the source electrodes 106 are electrically connected or integrally formed with corresponding data lines 107.

For example, the materials of the plurality of gate lines 102 and/or the plurality of data lines are metals, for example, may be a single layer of any of aluminum, aluminum alloy, copper, copper alloy, molybdenum or the like, or a laminated layer of several above metals.

For example, the planarization layer 113 may be made from insulating materials, e.g., organic insulating materials. The organic insulating materials, for example, include acrylic resin, polyimide resin, etc.

For example, the planarization layer 113 may be configured to perform planarization treatment on the CF layer 118 and has low dielectric constant.

For example, FIG. 6 is a flowchart of a process of forming the CF layer. The CF layer includes three kinds of filter patterns of different colors. The forming process includes the following steps.

(1) Firstly, forming green filter patterns 110. The green filter pattern 110 includes a green first extension 1101 extended along the gate line direction, a green main part 1102 extended along the data line direction, and green lateral extensions 1103 disposed on both sides of the green main part 1102 and at positions corresponding to the data line. The length of the green first extension 1101 is greater than or equal to the length of one subpixel (for example, the subpixel is a blue subpixel) along the gate line direction.

(2) Secondly, forming red filter patterns 111. The red filter pattern 111 includes a red main part 1112 extended along the data line direction, and red lateral extensions 1113 disposed on both sides of the red main part 1112 and at positions corresponding to the data line. The red lateral extensions 1113 of the red filter pattern 111 are superimposed with green lateral extensions 1103 of an adjacent green filter pattern 110 at positions corresponding to the data line. The red lateral extensions 1113 of the red filter pattern 111 and the green lateral extensions of the green filter pattern 110 are the superimposed parts of the red filter pattern and the green filter pattern at the positions corresponding to the data line. For example, orthographic projections of the superimposed parts on the base substrate 101 completely cover orthographic projections of corresponding data line on the base substrate 101, so as to shield light.

(3) Finally, forming blue filter patterns 112. The blue filter pattern 112 includes a blue main part 1122, blue lateral extensions 1123 disposed on both sides of the blue main part 1122 and at positions corresponding to the data line, and a blue first extension 1121 extended along the gate line direction. The length of the blue first extension 1121 is greater than or equal to the length of two subpixels (the two subpixels, for example, are respectively a red subpixel and a green subpixel) along the gate line direction.

The blue first extension 1121 of the blue filter pattern 112 is superimposed with main parts of corresponding red filter pattern 111 and corresponding green filter pattern 110 at positions corresponding to the gate line and the TFT, and the blue main part 1122 is superimposed with the green first extension 1101 at a position corresponding to the gate line and the TFT. Thus, in the CF layer, two filter patterns of different colors are provided with mutually superimposed parts at positions corresponding to the gate line and the TFT. For example, orthographic projections of the superimposed parts on the base substrate 101 completely cover orthographic projections of the gate line and the TFT on the base substrate 101. The blue lateral extensions 1123 of the blue filter pattern 112 are superimposed with a green lateral extension 1103 of an adjacent green filter pattern 110 and a red lateral extension 1113 of an adjacent red filter pattern 111, namely two filter patterns of different colors are provided with mutually superimposed parts at positions corresponding to the data line. For example, orthographic projections of the superimposed parts on the base substrate 101 completely cover orthographic projections of the data line on the base substrate 101, so as to shield light. The blue filter patterns 112 are the filter patterns with the minimum light transmittance in the above three kinds of filter patterns of different colors.

The embodiment further provides a method for manufacturing an array substrate, which comprises: forming a CF layer, a plurality of TFTs, a plurality of data lines and a plurality of gate lines on a base substrate. The CF layer includes a plurality of filter patterns of different colors, and filter patterns of each color include a plurality of filter units. At least two kinds of filter patterns of different colors are provided with mutually superimposed parts at positions corresponding to the plurality of gate lines, the plurality of data lines and the plurality of TFTs, and the superimposed parts are configured to separate the filter units. One of the at least two kinds of filter patterns of different colors, provided with the mutually superimposed parts at the positions corresponding to the gate lines and the plurality of TFTs, are filter patterns with minimum light transmittance in the plurality of filter patterns of different colors.

For example, in the method for manufacturing the array substrate, the process of forming the CF layer may be as described above.

In summary, in the CF layer, the red filter patterns and the blue filter patterns are provided with mutually superimposed parts extended along the gate line direction; the green filter patterns and the blue filter patterns are provided with mutually superimposed parts extended along the gate line direction; and the mutually superimposed parts, extended along the gate line direction, of the red filter patterns and the blue filter patterns, and the mutually superimposed parts, extended along the gate line direction, of the green filter patterns and the blue filter patterns correspond to the positions of the plurality of gate lines and the plurality of TFTs. Thus, two kinds of filter patterns of different colors are provided with superimposed parts at positions corresponding to the plurality of gate lines and the plurality of TFTs. For example, orthographic projections of the superimposed parts on the base substrate 101 completely cover orthographic projections of the gate lines and the TFTs on the base substrate 101. In the CF layer, the red filter patterns and the green filter patterns are provided with mutually superimposed parts extended along the data line direction; the green filter patterns and the blue filter patterns are provided with mutually superimposed parts extended along the data line direction; the blue filter patterns and the red filter patterns are provided with mutually superimposed parts extended along the data line direction; and the mutually superimposed parts, extended along the data line direction, of the red filter patterns and the green filter patterns, the mutually superimposed parts, extended along the data line direction, of the green filter patterns and the blue filter patterns, and the mutually superimposed parts, extended along the data line direction, of the blue filter patterns and the red filter patterns correspond to positions of the plurality of data lines. Thus, two kinds of filter patterns of different colors are provided with mutually superimposed parts at positions corresponding to the plurality of data lines. For example, orthographic projections of the superimposed parts on the base substrate 101 completely cover orthographic projections of corresponding data lines on the base substrate 101. The superimposed parts are configured to separate the filter units.

Third Embodiment

The embodiment provides an array substrate. As illustrated in FIGS. 1a and 1b and FIGS. 10 to 13, the array substrate comprises a base substrate 101 and a CF layer 118, a plurality of TFTs 117, a plurality of data lines 107 and a plurality of gate lines 102 disposed on the base substrate 101.

For example, as illustrated in FIG. 1a, the plurality of data lines 107 and the plurality of gate lines 102 are intersected with and insulated from each other to define a plurality of subpixels 119 arranged in an array.

For example, as illustrated in FIG. 1b, the CF layer 118 includes a plurality of filter patterns of different colors, and filter patterns of each color include a plurality of filter units 121. At least two kinds of filter patterns of different colors are provided with mutually superimposed parts at positions corresponding to the plurality of gate lines 102, the plurality of data lines 107 and the plurality of TFTs 117, and the superimposed parts are configured to separate the filter units 121. Peripheral areas around the filter units 121 are superimposed parts 122 of the at least two kinds of filter patterns of different colors. The superimposed parts 122 correspond to the positions of the plurality of gate lines, the plurality of data lines and the plurality of TFTs. The superimposed parts 122 are configured to separate the filter units 121. In the figure, dotted lines are used to represent the plurality of data lines 107, the plurality of gate lines 102 and the subpixels 119 disposed on the base substrate.

Figure 10:
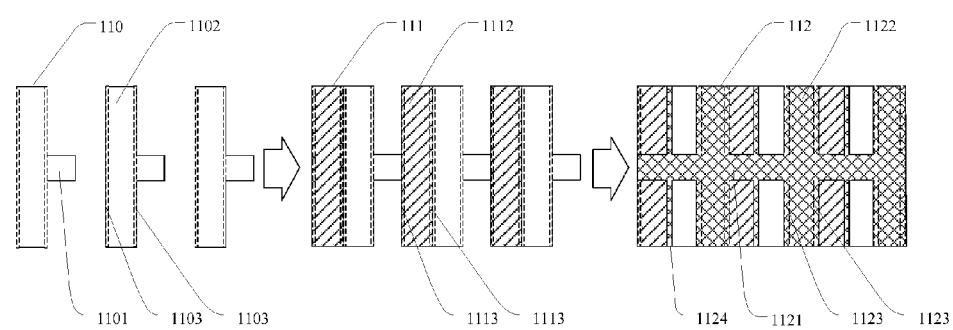
FIG. 10 is a flowchart 3 of a process of forming a CF layer in an array substrate provided by still another embodiment of the present disclosure.

As illustrated in FIG. 10, the CF layer 118 includes a plurality of filter patterns of different colors, for example, including green filter patterns 110, red filter patterns 111 and blue filter patterns 112.

In the CF layer, at least two kinds of filter patterns of different colors are provided with mutually superimposed parts at positions corresponding to the plurality of gate lines 102, the plurality of data lines 107 and the plurality of TFTs 117, and the superimposed parts are configured to separate the filter units 121. Moreover, one of the at least two kinds of filter patterns of different colors, provided with the mutually superimposed parts at the positions corresponding to the plurality of gate lines 102 and the plurality of TFTs 117, are filter patterns with minimum light transmittance in the plurality of filter patterns of different colors.

Figure 11:
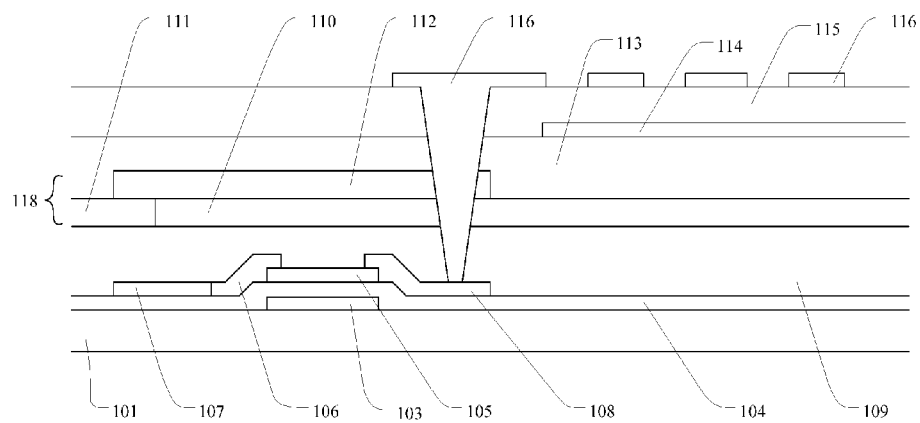
Figure 12:
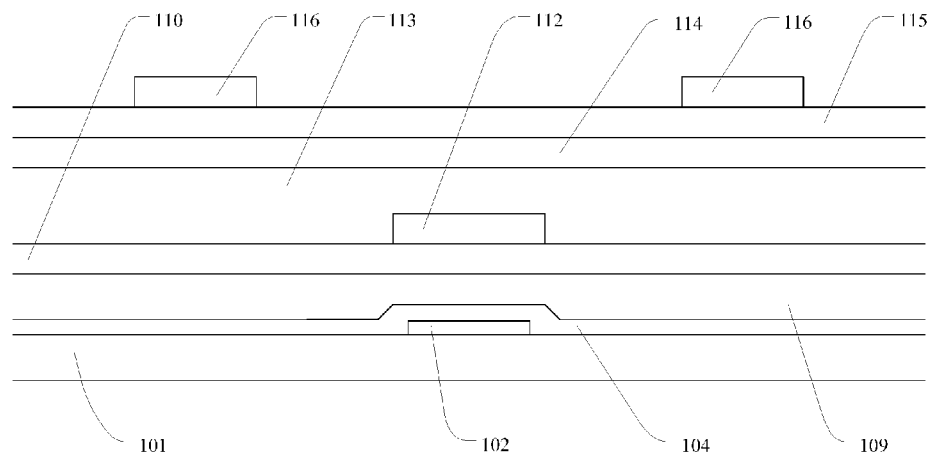
Figure 13:
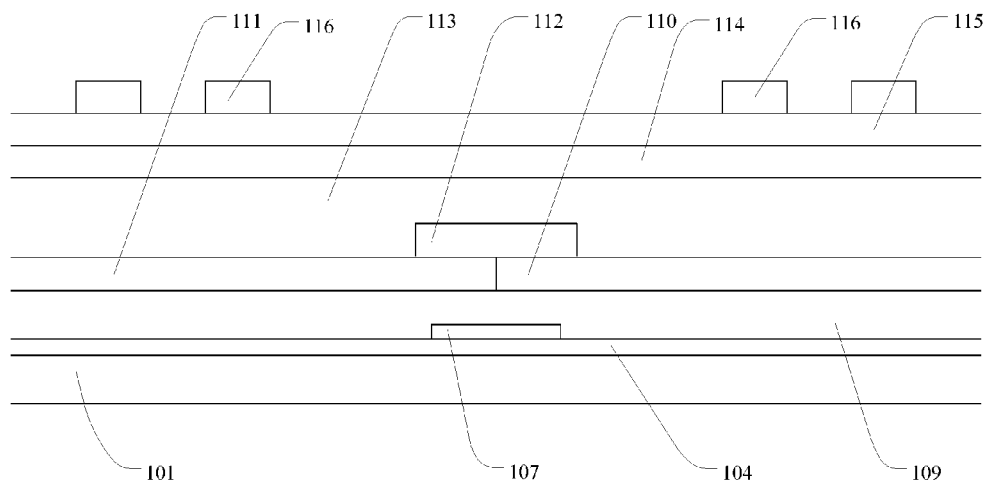

For example, FIG. 11 is a sectional view along the A-A' direction in FIG. 1a; FIG. 12 is a sectional view along the B-B' direction in FIG. 1a; and FIG. 13 is a sectional view along the C-C' in FIG. 1a. As illustrated in FIG. 11, the green filter pattern 110 and the blue filter pattern 112 are provided with a mutually superimposed part at a position corresponding to the TFT 117. As illustrated in FIG. 12, the green filter pattern 110 and the blue filter pattern 112 are provided with a mutually superimposed part at a position corresponding to the gate line 102. As illustrated in FIG. 13, the red filter pattern 111 and the blue filter pattern 112 are provided with a mutually superimposed part at a position corresponding to the data line 107, and the blue filter pattern 112 and the green filter pattern 110 are provided with a mutually superimposed part at a position corresponding to the data line 107. Thus, one of the at least two kinds of filter patterns of different colors, provided with the mutually superimposed parts at the positions corresponding to the data lines, are filter patterns with minimum light transmittance. For example, the filter patterns with the minimum light transmittance are the blue filter patterns 112.

It should be noted that FIGS. 11 to 13 only illustrate the superimposition condition of the filter patterns in the CF layer at positions of corresponding section lines.

For example, as illustrated in FIG. 11, the array substrate comprises TFTs 117 and pixel electrodes 116. The TFT 117 includes a gate electrode 103, a gate insulating layer 104, an active layer 105, a source electrode 106 and a drain electrode 108.

For example, the gate electrode 103 of the TFT 117 is electrically connected or integrally formed with corresponding gate line 102, and the source electrode 106 is electrically connected or integrally formed with corresponding data line 107.

For example, the materials of the plurality of gate lines 102 and/or the plurality of gate lines 107 are metals, for example, may be a single layer of any of aluminum, aluminum alloy, copper, copper alloy, molybdenum or the like, or a superimposed layer of several above metals.

For example, FIG. 10 is a flowchart of a process of forming the CF layer. The CF layer includes three kinds of filter patterns of different colors. The forming process includes the following steps.

(1) Firstly, forming green filter patterns 110. The green filter pattern 110 includes a green first extension 1101 extended along the gate line direction, a green main part 1102 extended along the data line direction, and green lateral extensions 1103 disposed on both sides of the green main part 1102 and at positions corresponding to the data line. The length of the green first extension 1101 extended along the gate line direction is greater than or equal to the length of one subpixel (the subpixel is, for example, a blue subpixel) along the gate line direction.

(2) Secondly, forming red filter patterns 111. The red filter pattern 111 includes a red main part 1112 extended along the data line direction, and red lateral extensions 1113 disposed on both sides of the red main part 1112 and at positions corresponding to the data line. The red lateral extensions 1113 are adjacent to the green lateral extensions 1103.

(3) Finally, forming blue filter patterns 112. The blue filter pattern 112 includes a blue first extension 1121 extended along the gate line direction, a blue main part 1122 extended along the data line direction, blue lateral extensions 1123 disposed on both sides of the blue main part 1122 and at positions corresponding to the data line, and a blue third extension 1124 disposed between the green filter pattern 110 and the red filter pattern 111 and at a position corresponding to the data line. The length of the blue first extension 1121 of the blue filter pattern 112 is greater than or equal to the length of two subpixels (the two subpixels are, for example, respectively a red subpixel and a green subpixel) along the gate line direction. The blue first extension 1121 of the blue filter pattern 112 is superimposed with main parts 1112 and 1102 of corresponding red filter pattern 111 and corresponding green filter pattern 110 at positions corresponding to the gate line and the TFT, and the blue main part 1122 is superimposed with the green first extension 1101 at a position corresponding to the gate line and the TFT. Thus, in the CF layer, at least two kinds of filter patterns of different colors are provided with mutually superimposed parts at positions corresponding to the gate lines and the TFTs. For example, orthographic projections of the superimposed parts on the base substrate 101 completely cover orthographic projections of the gate lines and the TFTs on the base substrate 101. The blue lateral extensions 1123 of the blue filter pattern 112 are respectively superimposed with a green lateral extension 1103 of an adjacent green filter pattern 110 and a red lateral extension 1113 of an adjacent red filter pattern 111 at positions corresponding to the data line. The blue third extension 1124 of the blue filter pattern 112 is superimposed with a green lateral extension 1102 of an adjacent green filter pattern 110 and a red lateral extension 1112 of an adjacent red filter pattern 111, at positions corresponding to the data line, between the green filter pattern 110 and the red filter pattern 111. Thus, in the CF layer, two kinds of filter patterns of different colors are provided with mutually superimposed parts at positions corresponding to the data lines. For example, orthographic projections of the superimposed parts on the base substrate 101 completely cover orthographic projections of corresponding data lines on the base substrate 101. The blue filter patterns 112 are filter patterns with minimum light transmittance in the above three kinds of filter patterns of different colors.

In summary, in the CF layer, the red filter patterns and the blue filter patterns are provided with mutually superimposed parts extended along the gate line direction; the green filter patterns and the blue filter patterns are provided with mutually superimposed parts extended along the gate line direction; and the mutually superimposed parts, extended along the gate line direction, of the red filter patterns and the blue filter patterns, and the mutually superimposed parts, extended along the gate line direction, of the green filter patterns and the blue filter patterns correspond to the positions of the plurality of gate lines and the plurality of TFTs. In the CF layer, the red filter patterns and the blue filter patterns are provided with mutually superimposed parts extended along the data line direction; the green filter patterns and the blue filter patterns are provided with mutually superimposed parts extended along the data line direction; and the mutually superimposed parts of the red filter patterns and the blue filter patterns and the mutually superimposed parts of the green filter patterns and the blue filter patterns correspond to the positions of the plurality of data lines.

The embodiment further provides a method for manufacturing an array substrate, which comprises: forming a CF layer, a plurality of TFTs, a plurality of data lines and a plurality of gate lines on a base substrate. The CF layer includes a plurality of filter patterns of different colors, and filter patterns of each color include a plurality of filter units. At least two kinds of filter patterns of different colors are provided with mutually superimposed parts at positions corresponding to the plurality of gate lines, the plurality of data lines and the plurality of TFTs, and the superimposed parts are configured to separate the filter units. One of the at least two kinds of filter patterns of different colors, provided with the mutually superimposed parts at the positions corresponding to the gate lines and the plurality of TFTs, are filter patterns with minimum light transmittance in the plurality of filter patterns of different colors.

For example, in the method for manufacturing the array substrate, the process of forming the CF layer may be as described above.

It should be noted that the CF patterns in the embodiment are not limited to the above forming sequence. The forming of the CF patterns in the embodiment is also not limited to the given forming process. Other structures and description in the array substrate may refer to the first embodiment.

It should be noted that the settings of the superimposed parts in the CF layer are not limited to the given cases in the above embodiments, as long as the followings are satisfied: in the CF layer, at least two kinds of filter patterns of different colors are provided with mutually superimposed parts at positions corresponding to the plurality of gate lines, the plurality of data lines and the plurality of TFTs, and the superimposed parts are configured to separate the filter units; and one of the at least two kinds of filter patterns of different colors, provided with the mutually superimposed parts at the positions corresponding to the gate lines and the plurality of TFTs, are filter patterns with minimum light transmittance in the plurality of filter patterns of different colors. For example, at least three kinds of filter patterns of different colors are provided with mutually superimposed parts at positions corresponding to the plurality of gate lines, the plurality of data lines and the plurality of TFTs. For example, the at least three kinds of filter patterns of different colors include blue filter patterns, red filter patterns and green filter patterns.

It should be noted that the subpixels and/or the filter units in the present disclosure are not limited to the drawn forms in the embodiment of the present disclosure and may also adopt other arrangement modes, for example, being arranged in the shape of trefoil. Similarly, description is given in the embodiment of the present disclosure by taking red, green and blue (RGB) filter patterns commonly used in the art as an example. The embodiment of the present disclosure may also adopt filter patterns of other colors, e.g., three primary colors formed by magenta, yellow and cyan.

Figure 14:
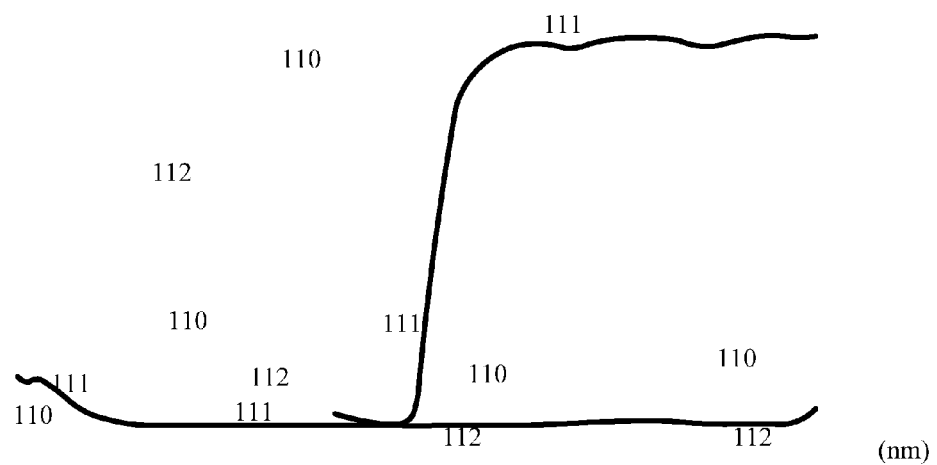
FIG. 14 is a diagram illustrating the wavelength range of light capable of running through filter patterns of different colors.

In the array substrate and the manufacturing method thereof provided by the embodiment of the present disclosure, in the CF layer, at least two kinds of filter patterns of different colors are provided with mutually superimposed parts at positions corresponding to the plurality of gate lines, the plurality of data lines and the plurality of TFTs, and one of the at least two kinds of filter patterns of different colors, provided with the mutually superimposed parts at the positions corresponding to the gate lines and the plurality of TFTs, are filter patterns with minimum light transmittance in the plurality of filter patterns of different colors. When light runs through filter patterns of one color (e.g., red), only light of this color can run through the filter patterns of this color. When the light runs through filter patterns of another color (e.g., blue), as light capable of running through the two kinds of filter patterns has different wavelengths, when the filter patterns of at least two colors are overlapped (superimposed), the amount of light running through superimposed parts of the CF layer can be greatly reduced. Thus, when one of the at least two kinds of filter patterns of different colors, provided with the mutually superimposed parts at the positions corresponding to the gate lines and the plurality of TFTs, are filter patterns with minimum light transmittance in the plurality of filter patterns of different colors, as the filter patterns have low light transmittance and the wavelength of light capable of running through the filter patterns is greatly different from the wavelength of light capable of running through filter patterns of other colors, the light capable of running through the superimposed parts of the CF layer can be further reduced. Thus, the light shielding effect can be achieved, and then the effect similar to BMs can be realized. For example, the wavelength range of the light capable of running through the filter patterns of different colors is as illustrated in FIG. 14. In order to achieve optimum light shielding effect, the wavelength of the light running through the two kinds of filter patterns must be not superimposed. For example, good effect can be achieved by the superimposition of the red filter patterns and the blue filter patterns. Therefore, the array substrate provided by the embodiment of the present disclosure may not additionally arrange BMs and then can reduce the process of forming the BMs in the manufacturing process, and hence can reduce a mask for forming the BMs, save materials, and reduce the cost. Moreover, as the blue filter patterns have minimum light transmittance, superior light shielding effect can be achieved by the superimposition of the blue filter patterns with the other two kinds of filter patterns.

Fourth Embodiment

The embodiment provides a display panel, which comprises the array substrate provided by any foregoing embodiment of the present disclosure. The array substrate is not limited to the array substrate described above with reference to the accompanying drawings. The display panel further comprises an opposing substrate arranged opposite to the array substrate, and BMs and a CF layer are not disposed on the opposing substrate. The opposing substrate and the array substrate are oppositely arranged and are respectively an upper substrate and a lower substrate of the display panel. Display structures such as a TFT array are generally formed on the array substrate.

For example, the display panel may be various types of LCDs, e.g., twisted nematic (TN) mode, vertical alignment (VA) mode, in-plane switching (IPS) mode or fringe field switching (FFS) mode. The embodiment of the present disclosure is not limited to the specific mode. According to different modes of the display panel, common electrodes cooperated with pixel electrodes to produce electric fields for driving liquid crystals may be formed on the array substrate and may also be formed on the opposing substrate.

As the CF layer is formed on the array substrate, the display panel provided by the embodiment of the present disclosure can reduce the deviation between the array substrate and the opposing substrate during cell-assembly, improve the aperture opening ratio, reduce the cost, and improve the display quality of products. Meanwhile, the array substrate of the display panel provided by the embodiment of the present disclosure does not require the additional arrangement of BMs, and hence can reduce the process of forming the BMs in the manufacturing process, reduce a mask for forming the BMs, save materials, and reduce the cost.

Fifth Embodiment

The embodiment of the present disclosure provides a display device, which comprises any foregoing display panel.

In summary, at least one embodiment of the present disclosure provides an array substrate, a manufacturing method thereof, a display panel and a display device. The array substrate comprises a CF layer; the CF layer includes a plurality of filter patterns of different colors; and filter patterns of each color include a plurality of filter units. At least two kinds of filter patterns of different colors are provided with mutually superimposed parts at positions corresponding to the plurality of gate lines, the plurality of data lines and the plurality of TFTs, and the superimposed parts are configured to separate the filter units; and one of the at least two kinds of filter patterns of different colors, provided with the mutually superimposed parts at the positions corresponding to the gate lines and the plurality of TFTs, are filter patterns with minimum light transmittance in the plurality of filter patterns of different colors. Thus, the light shielding effect can be achieved. Therefore, the array substrate provided by the embodiment of the present disclosure does not require the additional arrangement of BMs, and hence can reduce the process of forming the BMs in the manufacturing process, reduce a mask for forming the BMs, save materials, and reduce the cost. Moreover, superior light shielding effect can be achieved by the superimposition of a filter pattern with minimum light transmittance with at least one other filter pattern.

The following points should be noted:

(1) Unless otherwise specified, the technical terms or scientific terms used in the disclosure have normal meanings understood by those skilled in the art. The words "first", "second" and the like used in the disclosure do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

(2) Only the structures relevant to the embodiments of the present invention are involved in the accompanying drawings of the embodiments of the present invention, and other structures may refer to the prior art.

(3) For clarity, the thickness of layers or areas in the accompanying drawings of the embodiments of the present invention is enlarged. It should be understood that when an element such as a layer, a film, an area or a substrate is referred to be disposed "on" or "beneath" another element, the element may be "directly" disposed "on" or "beneath" another element, or an intermediate element may be provided.

(4) The embodiments of the present invention and the characteristics in the embodiments may be mutually combined without conflict.

The foregoing is only the preferred embodiments of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The application claims priority to the Chinese patent application No. 201510543473.0, filed Aug. 28, 2015, the disclosure of which is incorporated herein by reference as part of the application.

The invention claimed is:

1. An array substrate, comprising a base substrate and a color filter (CF) layer, a plurality of thin-film transistors (TFTs), a plurality of data lines and a plurality of gate lines disposed on the base substrate, wherein:
   the CF layer includes a plurality of filter patterns of different colors, and filter patterns of each color include a plurality of filter units;
   at least two kinds of filter patterns of different colors are provided with mutually superimposed parts at positions corresponding to the plurality of gate lines, the plurality of data lines and the plurality of TFTs, and the mutually superimposed parts entirely cover corresponding gate lines, data lines and TFTs;
   the mutually superimposed parts are configured to separate the filter units; and
   one of the at least two kinds of filter patterns of different colors, provided with the mutually superimposed parts at the positions corresponding to the plurality of gate lines and the plurality of TFTs, are filter patterns with minimum light transmittance in the plurality of filter patterns of different colors.

2. The array substrate according to claim 1, wherein one of the at least two kinds of filter patterns of different colors, provided with the mutually superimposed parts at the positions corresponding to the plurality of data lines, are the filter patterns with minimum light transmittance.

3. The array substrate according to claim 1, wherein the plurality of filter patterns of different colors include blue filter patterns, red filter patterns and green filter patterns.

4. The array substrate according to claim 3, wherein the at least two kinds of filter patterns of different colors, provided with the mutually superimposed parts at the positions corresponding to the plurality of gate lines, the plurality of data lines and the plurality of TFTs, include the blue filter patterns and the red filter patterns.

5. The array substrate according to claim 3, wherein the filter patterns with the minimum light transmittance are the blue filter patterns.

6. The array substrate according to claim 1, wherein at least three kinds of filter patterns of different colors are provided with mutually superimposed parts at positions corresponding to the plurality of gate lines, the plurality of data lines and the plurality of TFTs.

7. The array substrate according to claim 6, wherein the at least three kinds of filter patterns of different colors include blue filter patterns, red filter patterns and green filter patterns.

8. The array substrate according to claim 1, wherein the CF layer is disposed above the plurality of gate lines, the plurality of data lines and the plurality of TFTs.

9. The array substrate according to claim 1, wherein the plurality of data lines and the plurality of gate lines are intersected to define a plurality of subpixels arranged in an array; and each subpixel corresponds to one filter unit and includes at least one TFT.

10. The array substrate according to claim 1, further comprising a planarization layer, wherein the planarization layer is disposed on the CF layer and provided with a planar or basically planar surface.

11. A display panel, comprising the array substrate according to claim 1.

12. A display device, comprising the display panel according to claim 11.

13. The display panel according to claim 11, wherein one of the at least two kinds of filter patterns of different colors, provided with the mutually superimposed parts at the positions corresponding to the plurality of data lines, are the filter patterns with minimum light transmittance.

14. The display panel according to claim 11, wherein the plurality of filter patterns of different colors include blue filter patterns, red filter patterns and green filter patterns.

15. The display panel according to claim 14, wherein the at least two kinds of filter patterns of different colors, provided with the mutually superimposed parts at the positions corresponding to the plurality of gate lines, the plurality of data lines and the plurality of TFTs, include the blue filter patterns and the red filter patterns.

16. The display panel according to claim 14, wherein the filter patterns with the minimum light transmittance are the blue filter patterns.

17. The display panel according to claim 11, wherein at least three kinds of filter patterns of different colors are provided with mutually superimposed parts at positions corresponding to the plurality of gate lines, the plurality of data lines and the plurality of TFTs.

18. The display panel according to claim 17, wherein the at least three kinds of filter patterns of different colors include blue filter patterns, red filter patterns and green filter patterns.

19. A method for manufacturing an array substrate, comprising forming a color filter (CF) layer, a plurality of thin-film transistors (TFTs), a plurality of data lines and a plurality of gate lines on a base substrate, wherein:
- the CF layer includes a plurality of filter patterns of different colors, and filter patterns of each color include a plurality of filter units;
- at least two kinds of filter patterns of different colors are provided with mutually superimposed parts at positions corresponding to the plurality of gate lines, the plurality of data lines and the plurality of TFTs and the mutually superimposed parts entirely cover corresponding gate lines, data lines and TFTs;
- the mutually superimposed parts are configured to separate the filter units; and
- one of the at least two kinds of filter patterns of different colors, provided with the mutually superimposed parts at the positions corresponding to the plurality of gate lines and the plurality of TFTs, are filter patterns with minimum light transmittance in the plurality of filter patterns of different colors.

20. The method for manufacturing the array substrate according to claim 19, wherein one of the at least two kinds of filter patterns of different colors, provided with the mutually superimposed parts at the positions corresponding to the plurality of data lines, are the filter patterns with minimum light transmittance.

* * * * *